US009587610B2

(12) United States Patent
Hoffmann

(10) Patent No.: US 9,587,610 B2
(45) Date of Patent: Mar. 7, 2017

(54) METHOD FOR MONITORING THE CONDITION OF A PIEZO INJECTOR OF A FUEL INJECTION SYSTEM

(75) Inventor: Robert Hoffmann, Ruhstorf/Rott (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 835 days.

(21) Appl. No.: 13/882,483

(22) PCT Filed: Oct. 5, 2011

(86) PCT No.: PCT/EP2011/067388

§ 371 (c)(1),
(2), (4) Date: Apr. 29, 2013

(87) PCT Pub. No.: WO2012/055684

PCT Pub. Date: May 3, 2012

(65) Prior Publication Data

US 2013/0226472 A1 Aug. 29, 2013

(30) Foreign Application Priority Data

Oct. 29, 2010 (DE) ........................ 10 2010 043 150

(51) Int. Cl.

| | |
|---|---|
| ***G01B 5/30*** | (2006.01) |
| ***F02M 65/00*** | (2006.01) |
| ***F02D 41/20*** | (2006.01) |
| ***F02D 41/22*** | (2006.01) |

(52) U.S. Cl.

CPC ......... *F02M 65/00* (2013.01); *F02D 41/2096* (2013.01); *F02D 41/221* (2013.01)

(58) Field of Classification Search

CPC .... F02D 41/2096; F02D 41/221; F02M 65/00
See application file for complete search history.

(56) References Cited

U.S. PATENT DOCUMENTS

| | | | | |
|---|---|---|---|---|
| 6,380,659 | B2 | 4/2002 | Rueger et al. | 310/316.03 |
| 6,700,301 | B2 | 3/2004 | Rueger et al. | 310/316.03 |
| 7,405,507 | B2 | 7/2008 | Knicker et al. | 310/316.01 |
| 8,061,188 | B2 | 11/2011 | Hoffmann et al. | 73/114.45 |
| 9,103,297 | B2 * | 8/2015 | Brandt | F02D 41/2096 |
| 2013/0226472 | A1 | 8/2013 | Hoffmann | 702/38 |

FOREIGN PATENT DOCUMENTS

| | | | |
|---|---|---|---|
| DE | 19958406 A1 | 6/2001 | F02D 41/20 |
| DE | 10033196 A1 | 1/2002 | F02D 41/20 |

(Continued)

OTHER PUBLICATIONS

International Search Report and Written Opinion, Application No. PCT/EP2011/067388, 14 pages, Dec. 12, 2011.

*Primary Examiner* — Elias Desta

(74) *Attorney, Agent, or Firm* — Slayden Grubert Beard PLLC

(57) ABSTRACT

A method for monitoring the condition of a piezoinjector of a fuel injection system is disclosed. The fuel injection is carried out in injection cycles, each of which comprises a filling phase, a holding phase, and an emptying phase. The discharge resistance is ascertained during the holding phase of the piezoinjector. Conclusions about the working order of the piezoinjector are drawn using the ascertained discharge resistance.

18 Claims, 2 Drawing Sheets

(56) References Cited

FOREIGN PATENT DOCUMENTS

| | | | | |
|---|---|---|---|---|
| DE | 10336639 | A1 | 3/2005 | F02D 41/20 |
| DE | 102006036567 | B4 | 9/2008 | F02D 41/20 |
| DE | 102007038537 | A1 | 2/2009 | F02M 65/00 |
| EP | 1530677 | A1 | 5/2005 | F02D 41/20 |
| EP | 2113647 | A2 | 11/2009 | F02D 41/2096 |
| WO | 2012/055684 | A1 | 5/2012 | F02D 41/20 |

* cited by examiner

METHOD FOR MONITORING THE CONDITION OF A PIEZO INJECTOR OF A FUEL INJECTION SYSTEM

CROSS-REFERENCE TO RELATED APPLICATIONS

This application is a U.S. National Stage Application of International Application No. PCT/EP2011/067388 filed Oct. 5, 2011, which designates the United States of America, and claims priority to DE Application No. 10 2010 043 150.8 filed Oct. 29, 2010, the contents of which are hereby incorporated by reference in their entirety.

TECHNICAL FIELD

The disclosure relates to a method and system for monitoring the condition of a piezo injector that is used in conjunction with the fuel injection system in motor vehicles.

BACKGROUND

A piezo injector of this type comprises a piezoelectric actuator that converts an electrical control signal into a mechanical stroke movement. A nozzle needle is controlled by means of this stroke movement and it is possible using said nozzle needle to release through the injection holes of a nozzle unit the quantity of fuel flow more or less required in order to be able to inject in an appropriate manner into a cylinder of the motor vehicle a desired quantity of fuel that is dependent upon the electrical control signal.

Fuel injection systems of this type contribute greatly to the demanding wishes of customers being fulfilled and to the legal requirements with respect to fuel consumption and toxic emissions of the motor vehicle being fulfilled. This applies in particular to auto-ignition combustion engines having piezo-pump-nozzle systems and to piezo-common-rail systems.

Error indications, for example fuel leakages, sticking valves, deposits, leakage currents, etc., that occur in these systems generally result in a vehicle behaving in a manner that is undesirable, such as loss of power, increased toxic emissions or else also in an error memory lamp being activated. These error indications can occur both in the hydraulic system and also in the electrical system.

First and foremost, when using on-board diagnostic strategies in the dynamic operation of a vehicle, there is a limit as to how close the cause of errors in the injection system can be defined, let alone being able to ascertain precisely such causes, without during the course of the diagnosis having a negative influence on the manner in which the system behaves. In addition, the manufacturer of the motor vehicle frequently does not wish intrusive tests to be performed during the vehicle operation. Furthermore, the extent to which the location of the respective cause of the error can be ascertained is limited as a result of the limited amount of sensor information available on board.

Moreover, particularly moderate error indications in an injection system only influence the driving behavior in dependence upon the operating point. For example, a relatively high-ohm leakage resistance between the electrical connection of the piezoelectric actuator and the electrical ground has only a slight influence on short fuel injection operations and in fact is dependent upon the time constant that is obtained from the value of the leakage resistance and the capacity of the piezo element. In addition, the extent of the influence is still compensated by the system in dependence upon the value of the short circuit resistance and upon the actual operating point, for example depending upon whether the prevailing rotational speed or loading is in the low or middle range. This can be achieved, for example, by providing greater control energy for the piezoelectric actuator.

Moderate error indications only influence the manner in which the system behaves if it is necessary to provide a comparatively large fuel flow for the prevailing operating mode of the motor vehicle, in other words to provide a comparatively long period of control. In such cases, any loss of charge of the piezo actuator can over time result in an undesired reduction of the injection rate and consequently in a reduction of the quantity of fuel being injected. This reduction of the quantity of fuel being injected causes a loss of power that in many cases is associated with an increased exhaust emission.

Error indications of this type cannot be reproduced in a workshop or can only be reproduced at great expense, for example using a power-absorption roller and/or additional sensors, and it consequently represents a great challenge in a workshop when searching for errors.

Components that are still functional are frequently replaced unnecessarily in a workshop owing to a lack of precise knowledge of the cause of a prevailing error. Also, frequently too many components are replaced. For example, a still functional control unit (ECU) or an entire injector set is unnecessarily replaced although a prevailing undesired behavior of the system had been caused, for example, by a single defective injector or by a contaminated male connector in the cable harness.

Furthermore, manual interventions in the injection system of a motor vehicle frequently results undesirably in contaminants being introduced into the injection system and as a result components being damaged.

In addition, unless an initially moderate error is discovered, it can become a major error during the course of time. The consequence of a major error of this type is in many cases a total failure of the injection system and consequently the respective motor vehicle comes to a standstill.

An additional problem is that legal requirements for monitoring the functions of a motor vehicle have recently become more stringent. This applies both for the automotive market in Europe and also in the USA. It was previously sufficient to recognize and indicate serious errors in the system, for example, short circuits to the electrical ground of the motor vehicle. The fundamental tenor of current legislation is on the other hand the requirement to recognize any error that affects in any way the exhaust gas emission of the motor vehicle. This also includes recognizing the above mentioned moderate errors.

DE 10 2006 036 567 B4 discloses a method for ascertaining the functioning condition of a piezo injection of a combustion engine, in which the input variables of a control circuit for injecting fuel are the voltage value and the charge value. Furthermore, the continued capacity progression for the measured piezo injector is calculated based on a new capacity and the last stored capacity values with the aid of a mathematical approximation method. An actual malfunction of the piezo injector is recognized by virtue of the fact that a measured capacity value is outside a first upper and lower tolerance range by the calculated capacity progression. The piezo injection is immediately switched off if the measured capacity value is outside a second upper and lower threshold range by the calculated capacity progression, wherein the threshold range includes the tolerance range.

DE 103 36 639 A1 discloses a method and a device for diagnosing the function of a piezo actuator of a fuel measuring system of an internal combustion engine. The piezo actuator is charged using a pre-determinable electrical voltage and the charge quantity available in the case of this voltage is compared with a desired charge quantity that is to be expected in the case of this voltage. The functionality of the piezo actuator is ascertained from the difference between said charge quantities.

SUMMARY

One embodiment provides a method for monitoring the condition of a piezo injector of a fuel injection system, wherein fuel is injected during injection cycles that include in each case a charging phase, a holding phase and a discharging phase, wherein the leakage resistance of the piezo injector is ascertained during the holding phase and conclusions relating to the functionality of the piezo injector are drawn using the ascertained leakage resistance.

In a further embodiment, the piezo injector is charged to a predetermined voltage during the charging phase by means of a voltage source, said voltage is measured at the commencement of the holding phase and at the end of the holding phase and a difference value is calculated from the measured voltages.

In a further embodiment, the leakage resistance is calculated from the difference value, the duration of the injection operation and the capacity of the piezo injector.

In a further embodiment, during the holding phase further voltage values are measured and using the measured voltage values a straight line is calculated that describes the drop in voltage that occurs during the holding phase.

In a further embodiment, a plurality of measured voltage values are subjected to a mean determining process and the straight line is calculated from the mean values.

In a further embodiment, the gradient of the straight line is calculated based on a quotient that is formed from a time difference and a difference of the mean values.

In a further embodiment, the leakage resistance is calculated in accordance with the equation $R=U0/I$, wherein U0 is the voltage that is measured at the commencement of the holding phase and I is the mean leakage current.

In a further embodiment, the mean leakage current is calculated in accordance with the equation $I=\Delta Q/t$, wherein $\Delta Q$ is the amount of charge that has been lost and t is a time difference.

In a further embodiment, the amount of charge that has been lost is calculated in accordance with the equation $\Delta Q=C\cdot\Delta U$, wherein C is the capacity of the piezo injector and $\Delta U$ is the difference value of the measured voltages.

Another embodiment provides a system comprising a piezo injector configured to inject fuel during injection cycles that include a charging phase, a holding phase, and a discharging phase, and a monitoring system for monitoring the condition of the piezo injector as disclosed above. The monitoring system may include computer instructions stored in non-transitory computer-readable media and executable by a processor to determine a leakage resistance of the piezo injector during the holding phase, and determine a functionality of the piezo injector based on the determined leakage resistance, and to perform any of the other method steps and calculations disclosed above.

BRIEF DESCRIPTION OF THE DRAWINGS

Exemplary embodiments will be explained in more detail below on the basis of the schematic drawings, wherein.

DETAILED DESCRIPTION

Figure 1:
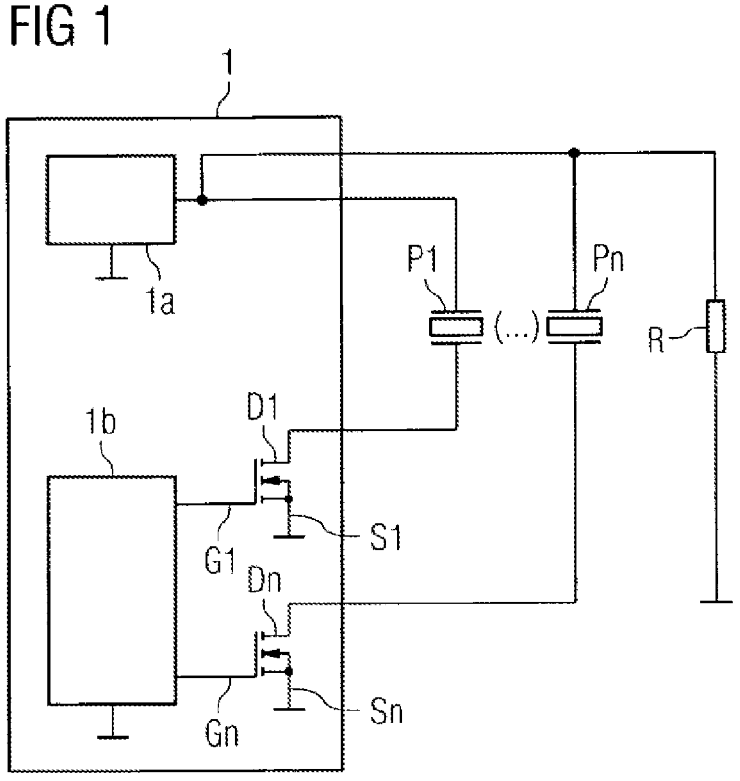
FIG. 1 illustrates a simplified equivalent circuit diagram for explaining a method in accordance with one embodiment.

Embodiments of the present disclosure provide an improved method and system for monitoring the condition of a piezo injector.

Advantages of certain embodiments include, for example, the fact the condition of the piezo injector can be monitored using variables that are often already available in known injection systems and are used for other purposes. These variables are linked together in new combinations in such a manner that new information is obtained that indicates the condition of the piezo injector. This new information is the leakage resistance of the piezo injector. If the leakage resistance has a higher value that a predetermined threshold value, then it is recognized that the piezo injector is functioning in a fault-free manner. If, on the other hand, the value of the leakage resistance is less than the predetermined threshold value, then it is recognized that the piezo injector is no longer functioning in a fault-free manner, in particular, that the value of the leakage resistance of the piezo injector has, as a result of environmental and/or aging influences, dropped to such an extent that there is the risk of a short circuit or of a voltage flashover.

A method for monitoring the condition of a piezo injector of a fuel injection system in accordance with one embodiment is suitable, for example, for auto-ignition combustion engines having piezo-pump-nozzle systems and for piezo-common-rail systems. It can, in particular, also be used during the usual vehicle operation. However, it can also be implemented in stable operating conditions that prevail in particular in the case of a stationary vehicle or in a workshop. Thus, a method can, for example, be performed during a switch-on test routine in the case of a stationary vehicle, during the overrun phase in the normal vehicle operation, within the scope of a switch-off test routine when parking the vehicle and also within the scope of a service stop in a workshop.

In one embodiment, the method can be performed at regular time intervals or in an event-based manner.

Furthermore, the time intervals between successive performances of the method can be varied based on statistics. If a performance of a method has resulted in an initial suspicion that there is a prevailing moderate error, then the time intervals between successive performances of the method can be shortened.

A piezo injector of a fuel injection system comprises a piezo actuator that is capable of storing the charge being provided. In contrast to coil-operated injectors, it is not necessary to supply a continuous holding current to the piezo actuator. The leakage resistance of a piezo injector that occurs between the high-side connection of the piezo injector and the electrical ground is in the megohm range when the piezo injector is new. As a result, it can be assumed that the piezo injector holds the voltage level, which it achieves during the charging phase, at least almost constant for the entire duration of the subsequent holding phase until the commencement of the discharging phase. However, environmental and/or aging influences in particular in conjunction with long injection times can cause the leakage resistance to drop in such a manner that said leakage resistance lies only in the two-digit ohm range. This drop in leakage resistance can result in the piezo injector becoming non-functional as a result of short circuits or rather voltage flashovers to ground and can result in the vehicle being damaged. In order to prevent this, the leakage resistance of the piezo injector is ascertained during the holding phase of an injection cycle and conclusions relating to the functionality of the piezo injector are drawn from the ascertained value of the leakage resistance, so that, if necessary, the necessary measures can be initiated in good time, for example the piezo injector can be replaced.

FIG. 1 illustrates a simplified equivalent circuit diagram for explaining a method in accordance with one embodiment. This equivalent circuit diagram illustrates a driver 1, piezo injectors P1, . . . , Pn and a leakage resistance R.

The driver 1 comprises a high-side driver unit 1*a* and a low-side driver unit 1*b*. The output of the high-side driver unit 1*a* is connected in each case to a connection of the piezo injectors P1, . . . , Pn and to the connection, remote from ground, of the leakage resistance R. The low-side driver unit 1*b* is connected to the gate connections G1, . . . , Gn of in total n field effect transistors, wherein the drain connection D1, . . . , Dn is connected to the respective other connection of the piezo injectors P1, . . . , Pn. The source connections S1, . . . , Sn of the field effect transistors are in each case connected to ground.

Figure 2:
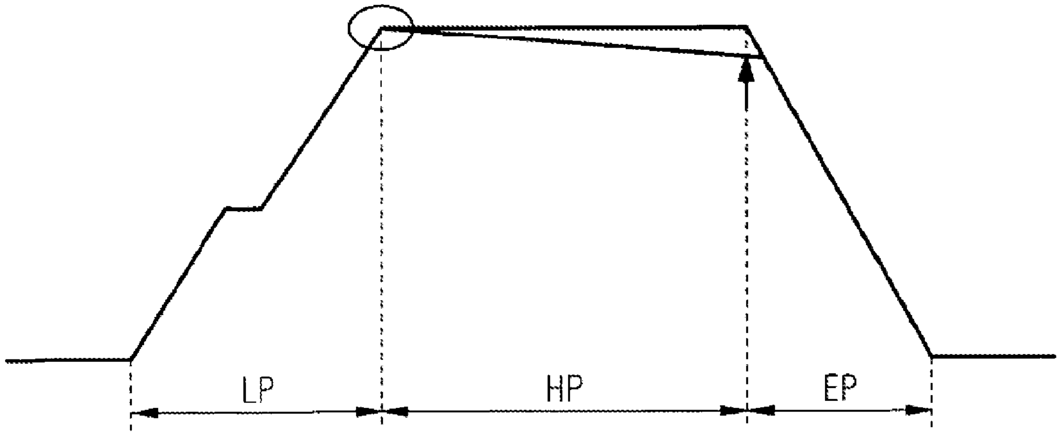
FIG. 2 illustrates a diagram for explaining an injection cycle in accordance with one embodiment.

The individual piezo injectors are controlled by the driver 1 in each case in injection cycles, wherein each injection cycle includes a charging phase LP, a holding phase HP and a discharging phase EP. This is illustrated in FIG. 2 that illustrates a diagram for explaining an injection cycle. The piezo injector is charged to a voltage value U0 during the charging phase LP by means of a voltage source. When the respective injector is new, the leakage resistance lies in the megohm range and this voltage value is held until the end of the holding phase HP. There then follows the discharging phase EP during which the piezo injector is discharged.

However, environmental and aging influences cause the leakage resistance of an injector to drop as time progresses. Nonetheless, it is still possible in the case of sufficient leakage resistance, for example where the resistance values are in the kiloohm range, to fully charge a piezo injector since as yet there has been no short circuit and also no voltage flashover to ground. However, the piezo injector does lose charge, for example, by way of a carbon track. This is evident in FIG. 2 from the straight line that drops off with a comparatively slight gradient during the holding phase HP.

If the voltage at the piezo injector is then measured at the commencement and at the end of the holding phase and the difference value between the measured voltages is then ascertained, then it is possible, by taking into additional consideration the duration of the injection operation and the capacity of the piezo injector, to draw conclusions relating to the amount of charge that has been lost and/or to a mean leakage current. Moreover, the leakage resistance can be calculated in the first approximation. Conclusions relating to the functionality of the piezo injector are drawn from the ascertained value of the leakage resistance, as explained hereinunder.

Figure 3:
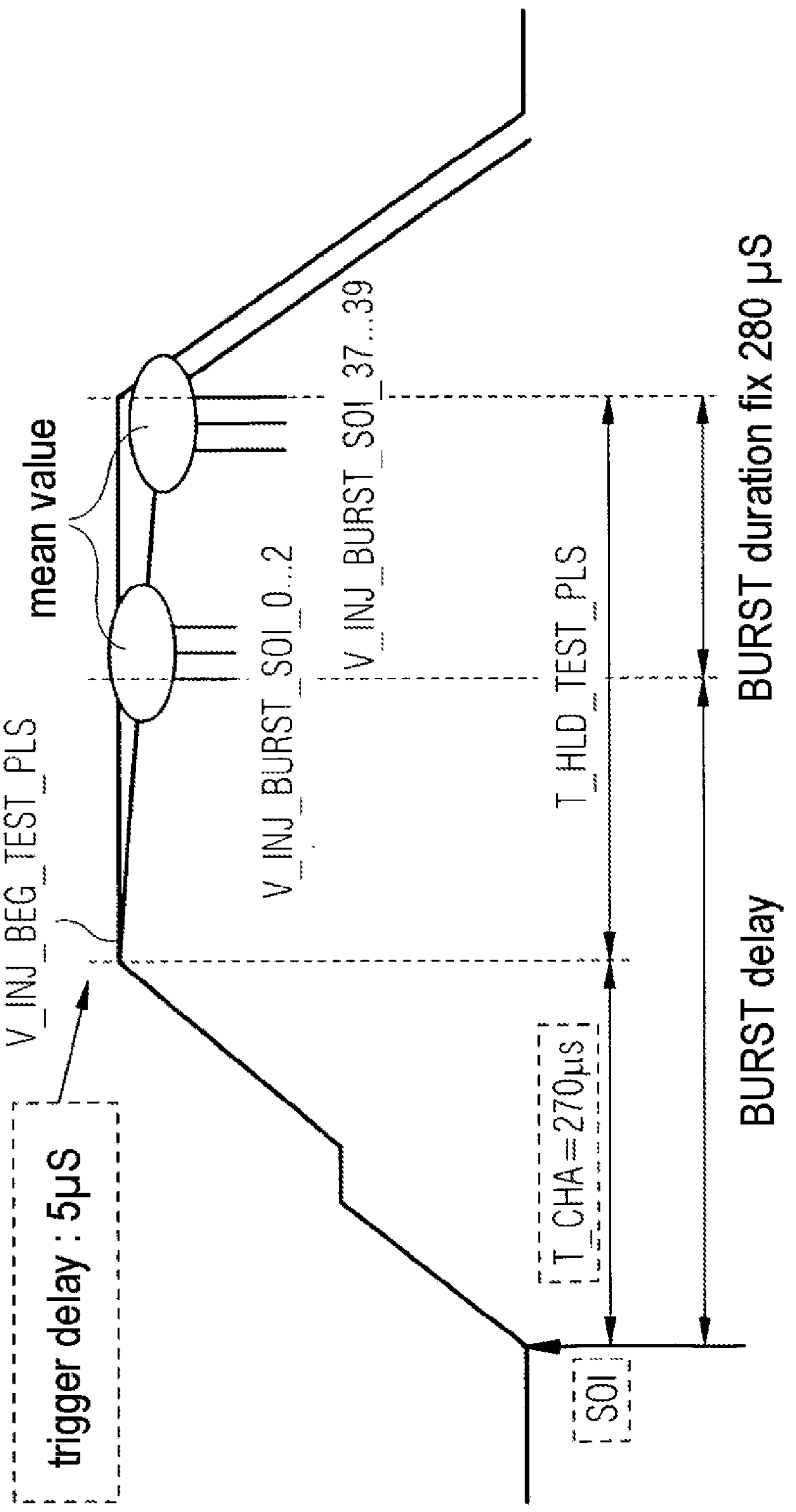
FIG. 3 illustrates a diagram for explaining a method in accordance with one embodiment.

In order to avoid unnecessary erroneous entries, a plausibility check may be performed on the calculated value of the leakage resistance. This is explained hereinunder with reference to FIG. 3. FIG. 3 illustrates a diagram for explaining a method in accordance with one embodiment.

In the case of this method, a plurality of voltage values are ascertained during the holding phase HP and a straight line function is calculated from said voltage values. A value for the leakage resistance is ascertained using this straight line function and said value is compared with the value for the leakage resistance that is ascertained in the first approximation. In the event that the values match at least to a great extent, the ascertained value is regarded as being correct and conclusions relating to the functionality of the piezo injector are drawn using the ascertained value for the leakage resistance.

When ascertaining the straight line function, a straight line gradient is ascertained using the equation:

$$y=m\cdot x+b$$

In order to compensate for the influence of anomalies and/or measuring errors, a mean value is formed from the subsequent measured values. The straight line gradient m is produced by calculating the quotient from the time difference and the difference of the mean values that have been formed.

A plausibility check is performed using the said formula by virtue of the fact that the value V_INJ_BEG_TEST_PLS_CLC is ascertained at the point in time T_CHA+trigger delay, in other words at approximately t=275 μs. This value must then be approximately equal to the value V_INJ_BEG_TEST_PLS, wherein a tolerance that can be calibrated is permitted.

A difference ΔU between the value U0, which is present at the commencement of the holding phase, and the value U, which is present at the end of the holding phase is formed from the measured voltage value U0=V_INJ_BEG_TEST_PLS and the mean value of the last three measured values of the BURST vector (cf. FIG. 3). The time t that is used when calculating the leakage resistance is obtained from the time difference between the measured voltage value U0 and the said mean value.

Accordingly, the following applies:

$$y = mx + b, \text{ wherein}$$

$$m = \frac{(\text{T\_sample} - \text{T\_sample2})}{\left(\begin{array}{l}\text{V\_INJ\_BURST\_SOI\_mean\_0} \ldots 2 - \\ \text{V\_INJ\_BURST\_SOI\_mean\_37} \ldots 39\end{array}\right.}$$

$$b = \text{V\_INJ\_BURST\_SOI\_mean\_0} \ldots 2 - m * \text{T\_sample}$$

$$\text{T\_sample} = \text{Burst delay} + 1 * 7\ \mu s$$

$$\text{T\_sample 2} = \text{Burst delay} + 38 * 7\ \mu s$$

where the point in time zero corresponds to the point in time SOI (start of injection).

For the purpose of calculating an example, it is assumed that the voltage at the piezo injection drops from 120V by 10V to 110V over a period of time of 1 ms in the case of a 6 μF capacity of the piezo injector.

In this case, the following equation applies for the amount of charge that has been lost:

$$\Delta Q = C \cdot \Delta U = 60\ \mu\text{As}.$$

The following is obtained for the mean leakage current:

$$I = \frac{\Delta Q}{t} = \frac{60\ \mu As}{1\ \text{ms}} = 60\ \text{mA}.$$

Consequently, the following applies for the leakage resistance:

$$R = \frac{U}{I} = \frac{120\text{ V}}{60\text{ mA}} = 2\text{ kOhm.}$$

The conclusion is drawn from a value of this type for the leakage resistance that the piezo injector is still functional.

In contrast, if the ascertained value of the leakage resistance is less that 1 kOhm, it is assumed that massive negative influences have affected the functionality of a piezo injector and consequently the operation of the respective engine of the motor vehicle. In particular, the time constant that is obtained from the product of the leakage resistance and the prevailing capacity of the piezo injector must be somewhat smaller than 10 times the duration of the injection operation in order to exert an undesired influence on the engine of the motor vehicle.

What is claimed is:

1. A method for operating a fuel injection system of an internal combustion engine, the method comprising:

testing a piezo injector during a switch-on test routine, a switch-off test routine, or an overrun phase of the internal combustion engine, the test including:

injecting fuel during an injection cycle that includes a charging phase, a holding phase, and a discharging phase, determining a leakage resistance of the piezo injector based on characteristics of the piezo injector measured during the holding phase, comparing the determined leakage resistance to a predetermined threshold, and switching off injection by the piezo injector during normal operation of the internal combustion engine if the determined leakage resistance is less than the predetermined threshold and providing an indication that the piezo injector should be replaced.

2. The method of claim 1, comprising:

charging the piezo injector to a predetermined voltage during the charging phase using a voltage source, measuring a voltage at the piezo injector at a beginning of the holding phase and at an end of the holding phase, and calculating a difference value from the measured voltages at the beginning and end of the holding phase.

3. The method of claim 2, comprising calculating the leakage resistance from the difference value, a duration of the injection operation, and a capacity of the piezo injector.

4. The method of claim 1, comprising:

measuring further voltage values during the holding phase, and calculating a straight line based on the measured voltage values that indicates a drop in voltage that occurs during the holding phase.

5. The method of claim 4, comprising applying a mean determining process to a plurality of measured voltage values to determined mean values, and calculating the straight line from the mean values.

6. The method of claim 5, comprising calculating a gradient of the straight line based on a quotient calculated from a time difference and a difference of the mean values.

7. The method of claim 1, comprising calculating the leakage resistance using the equation $R=U0/I$, wherein U0 is the voltage that is measured at the commencement of the holding phase and I is a mean leakage current.

8. The method of claim 7, comprising calculating the mean leakage current using the equation $I=\Delta Q/t$, wherein $\Delta Q$ is an amount of charge that has been lost and t is a time difference.

9. The method of claim 8, comprising calculating the amount of charge that has been lost using the equation $\Delta Q=C\cdot\Delta U$, wherein C is a capacity of the piezo injector and $\Delta U$ is a difference value indicating a difference of voltages measured at a beginning of the holding phase and at an end of the holding phase.

10. A fuel injection system for an internal combustion engine, the system comprising:

a combustion chamber;

a piezo injector to inject fuel into the combustion chamber during injection cycles;

wherein the injection cycles include a charging phase, a holding phase, and a discharging phase;

a controller directing the operation of the piezo injector, and a monitoring system for monitoring the condition of the piezo injector, the monitoring system comprising computer instructions stored in non-transitory computer-readable media and executable by a processor to test the piezo injector during a switch-on test routine, a switch-off test routine, or an overrun phase of the internal combustion engine, the test including:

determine a leakage resistance of the piezo injector based on characteristics of the piezo injector measured during the holding phase, and compare the determined leakage resistance to a predetermined threshold;

and wherein the controller switches off injection by the piezo injector during normal operation of the internal combustion engine if the determined leakage resistance is less that the predetermined threshold.

11. The system of claim 10, wherein the piezo injector is charged to a predetermined voltage during the charging phase using a voltage source, and wherein the monitoring system is configured to:

measure a voltage at the piezo injector at a beginning of the holding phase and at an end of the holding phase, and calculate a difference value from the measured voltages at the beginning and end of the holding phase.

12. The system of claim 11, wherein the monitoring system is configured to calculate the leakage resistance from the difference value, a duration of the injection operation, and a capacity of the piezo injector.

13. The system of claim 10, wherein the monitoring system is configured to:

measure further voltage values during the holding phase, and calculate a straight line based on the measured voltage values that indicates a drop in voltage that occurs during the holding phase.

14. The system of claim 13, wherein the monitoring system is configured to apply a mean determining process to a plurality of measured voltage values to determined mean values, and calculate the straight line from the mean values.

15. The system of claim 14, wherein the monitoring system is configured to calculate a gradient of the straight line based on a quotient calculated from a time difference and a difference of the mean values.

16. The system of claim 10, wherein the monitoring system is configured to calculate the leakage resistance using the equation $R=U0/I$, wherein U0 is the voltage that is measured at the commencement of the holding phase and I is a mean leakage current.

17. The system of claim 16, wherein the monitoring system is configured to calculate the mean leakage current using the equation $I=\Delta Q/t$, wherein $\Delta Q$ is an amount of charge that has been lost and t is a time difference.

18. The system of claim 17, wherein the monitoring system is configured to calculate the amount of charge that has been lost using the equation $\Delta Q=C\cdot\Delta U$, wherein C is a capacity of the piezo injector and $\Delta U$ is a difference value indicating a difference of voltages measured at a beginning of the holding phase and at an end of the holding phase.

* * * * *